United States Patent [19]

Larsson et al.

[11] Patent Number: 5,698,106

[45] Date of Patent: Dec. 16, 1997

[54] FILTRATION PROCESS AND APPARATUS

[75] Inventors: Hans Larsson, Västerhaninge; Ulf Hjelmner; Sven Håkansson, both of Nynäshamn, all of Sweden

[73] Assignee: Nordic Water Products AB, Nynsahamn, Sweden

[21] Appl. No.: 150,196

[22] PCT Filed: Jun. 3, 1992

[86] PCT No.: PCT/SE92/00381

§ 371 Date: Feb. 14, 1995

§ 102(e) Date: Feb. 14, 1995

[87] PCT Pub. No.: WO92/21422

PCT Pub. Date: Dec. 10, 1992

(Under 37 CFR 1.47)

[30] Foreign Application Priority Data

Jun. 4, 1991 [SE] Sweden ................... 9101695

[51] Int. Cl.$^6$ .................................. B01D 24/28
[52] U.S. Cl. ................... 210/675; 210/676; 210/677; 210/268; 210/269; 210/792; 210/189; 210/807
[58] Field of Search ........................... 210/268, 269, 210/274, 275, 792, 791, 793, 675, 676, 189, 807, 670, 677

[56] References Cited

U.S. PATENT DOCUMENTS

| | | |
|---|---|---|
| 3,667,604 | 6/1972 | Lagoutte ................... 210/136 |
| 3,767,048 | 10/1973 | Prengemann ............... 210/189 |
| 4,060,484 | 11/1977 | Austin et al. ............... 210/189 |
| 4,197,201 | 4/1980 | Hjelmnér et al. ........... 210/189 |
| 4,246,102 | 1/1981 | Hjelmner et al. ........... 210/704 |
| 4,720,347 | 1/1988 | Berne ......................... 210/792 |
| 4,891,142 | 1/1990 | Hering, Jr. ................. 210/792 |
| 5,019,278 | 5/1991 | Jacquet ...................... 210/792 |
| 5,112,504 | 5/1992 | Johnson ..................... 210/792 |
| 5,173,194 | 12/1992 | Hering, Jr. ................. 210/268 |
| 5,277,829 | 1/1994 | Ward ......................... 210/792 |
| 5,454,959 | 10/1995 | Stevens ..................... 210/792 |

FOREIGN PATENT DOCUMENTS

| | | |
|---|---|---|
| 0 343 980 | 11/1989 | European Pat. Off. . |
| 539266 | 11/1931 | Germany . |
| WO91/08818 | 6/1991 | WIPO . |

*Primary Examiner*—Cynthia L. Nessler
*Attorney, Agent, or Firm*—Jacobson, Price, Holman & Stern, PLLC

[57] ABSTRACT

It is possible to filter a suspension or emulsion in a filter bed of particulate filter medium by allowing the suspension to flow upwards through the filter bed simultaneously as the medium flows downwards through a filtering tank wherein filtration takes place. Filtration thus takes place during counterflow between suspension and filter medium. The supply of suspension takes place in the lower part of the filter bed and the filtered liquid phase is taken away from a zone above the filter bed. The polluted filter medium close to the bottom of the filter tank is taken out for conveyance to a washing apparatus above the filter bed and after washing is returned to the upper side of the filter bed. For providing a filter which has a considerably lower construction height for a given and unchanged volume of the filter medium, the washing apparatus is lowered so that its lower part is at a level below the upper surface of the filter bed.

9 Claims, 1 Drawing Sheet

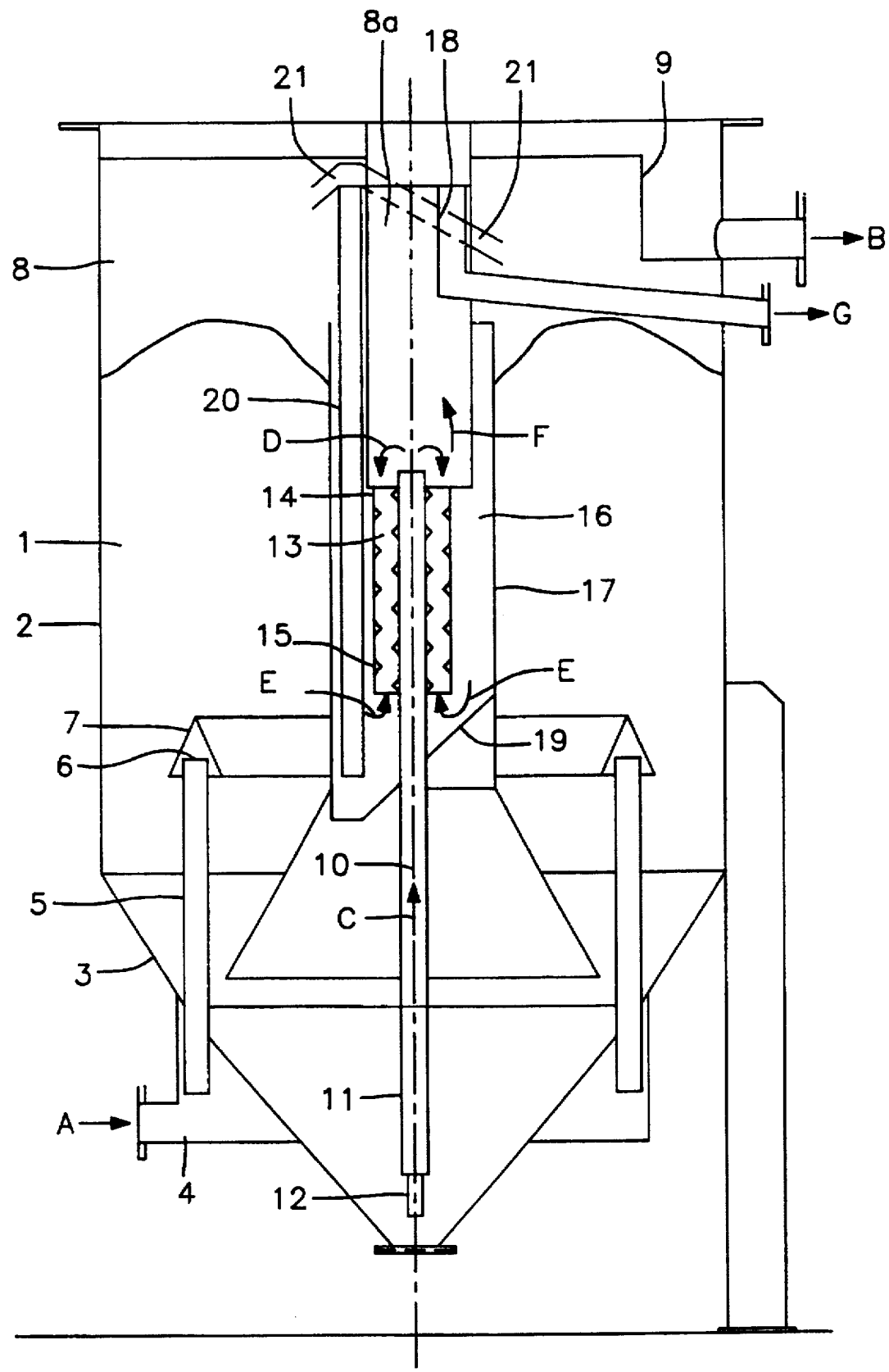

FILTRATION PROCESS AND APPARATUS

FIELD OF THE INVENTION

The present invention relates to a method of filtering a suspension or emulsion, and also relates to a filtering apparatus for carrying out the method.

BACKGROUND OF THE INVENTION

It may be read from the Swedish patent specification 396 552 that filtering a suspension or emulsion in a filter bed comprising particulate filter material may be carried out by allowing the suspension to flow upwards through the filter bed, simultaneously as the filter medium flows downwards through a filtering tank in which the filtration takes place. Filtering thus takes place during counter flow between suspension and filter medium. The suspension is supplied at a lower part of the filter bed and the filtered liquid phase is taken away from a zone above the filter bed. The polluted filter medium close to the bottom of the filter tank is taken out and conveyed to a washing apparatus above the filter bed, and after washing it is returned to the upper side of the filter bed. By continuous supply of suspension to the filter bed, continuous extraction of filtered liquid phase as well as continuous conveyance of polluted filter medium to the washing apparatus and washed filter medium back to the filter bed results in that the filtering apparatus operates completely continuously, and does not normally need to be taken out of operation.

Such filtering apparatus may reach considerable dimensions in order to receive large suspension flows. In large installations there may be a plurality of filtering units, which are placed side by side and work in parallel, this being more practical or more suited to the available space. A method of arranging a large installation of this kind is illustrated in FIG. 3 of the previously mentioned patent specification 396 552. A normal circular shape of the filtering units has been departed from here, and a hexagonal shape has been adopted to achieve compaction of the units. Since conveyance of the filter medium to the washing apparatus takes place through the filter bed, and the washing apparatus is also within the outer shell of the unit, there is nothing to prevent such compaction of such filtering units.

A number of factors affect the selection of the filter apparatus size, such as type of suspension or emulsion, desired purification degree, type of filter medium and, as previously mentioned, the magnitude of the suspension flow that is to be filtered. These factors determine the area and height of the filter bed body or bodies. The filtering apparatus is then designed from these dimensions, e.g. as is illustrated in FIG. 1 of the mentioned patent specification 396 552.

Although this figure is only a principle sketch, the proportions of the figure do not differ from reality to any notable degree. Accordingly, the observation may be made that a considerable portion of the height of the filtering apparatus has been used to make room for the polluted filter medium washing apparatus. In the case where the available height is limited in the space where the filter units are to be placed, the height of these tanks will cause some limitations in the design.

SUMMARY OF THE INVENTION

The present invention has come about to provide a filter, which has a considerably lower construction height for a given and unchanged volume of the filter medium. In accordance with the invention this has been arranged by sinking the lower part of the washing apparatus to a level under the upper surface of the filter bed, but with retention of a characteristic method of carrying out washing. This method of washing involves the provision of an upward current of washing liquid, constituting the ready-filtered liquid phase, in a washing path where the polluted filter medium is caused to fall downwards against the washing liquid flow. Since the washed filter medium comes in at a level which is too low in relation to the filter bed, due to sinking the level of the washing apparatus, extra conveying equipment for the filter medium up to the upper side of the filter bed will be required.

BRIEF DESCRIPTION OF THE DRAWINGS

The invention will be described in the form of a preferred embodiment and with reference to the accompanying drawing figure. The latter illustrates a filtering apparatus in vertical section.

DETAILED DESCRIPTION OF THE PREFERRED EMBODIMENTS

In the illustrated embodiment, the particulate filter medium 1 is enclosed in a container with walls 2 and a bottom 3 having a conical or pyramidical shape with the apex downwards. The base of the cone or pyramid should suitably conform to the shape of the container as defined by the walls 2.

Sand is well suited as particulate filter medium, although other materials, such as plastics may be used, or mixtures of several materials. After trials, one skilled in the art will find the most suitable material and particle size in each individual case, depending on what is to be filtered and how effectivly filtration shall take place.

The suspension or emulsion which is to be filtered is taken, as illustrated by the arrow A into the container via the inlet 4, e.g. through the bottom of the container. The inflow of the suspension in the filter bed takes place at the lower part of the bed via a plurality of pipes 5 with pipe openings 6. Above each of the pipe openings there is a shield 7 for preventing direct contact of the filter medium with the pipe openings and for exposing a larger surface of the filter medium to the incoming suspension. Alternatively, the suspension can be taken in from above through unillustrated pipes and under the shields 7. The risk of clogging the filter due to heavy instantaneous pollution of the filter medium adjacent the pipe openings is thus reduced. By the shields having a V-shape, and by placing the pipe openings under shields, there is achieved the least possible obstruction to the downward passage of the filter medium. Placing the inlet pipe openings 6 in the lower part of the filter bed results in the advantage that the most polluted part of the filter material, i.e. that which goes past the shields and the pipe openings, continues downwards and is not utilized further for filtration. Blockage at the inlets is thus prevented, and new filter medium is continuously exposed to the incoming suspension. The latter flows upwards in a direction counter to that of the filter medium through a zone of the filter bed towards an increasingly cleaner medium. The filtered liquid phase, obtained as a result of the upward flow of the suspension through the filter bed zone, is maintained as a zone 8 of filtered liquid phase above the filter bed, and in the illustrated embodiment example, its level is determined by the filtered liquid phase being taken out from the filtering apparatus via an overflow 9 to an outlet (arrow B).

The opening of some suitable elevating means 10 is situated in the conically or pyramidically shaped portion 3 of the container down which flows the filter medium polluted during filtration. As will be seen from the illustrated embodiment example, the elevating means extends centrally through the apparatus and can be such as a so-called mammoth pump. This type of pump uses air as conveying medium, and the air is supplied from above and down a conduit 11 extending along a conveyer pipe 12 included in the elevating means. Air is supplied through the conveyer pipe via unillustrated holes at the lower end of the conduit. The filter medium is conveyed (arrow C) by the air through the pipe 12 to a washing apparatus 13 situated in the filter bed.

The filter medium to be washed comes out from the upper part of the conveyer pipe 12, changes direction (arrow D), and runs downwards in a washing path formed between the elevating means 10 and an outer shell 14 of the washing apparatus. The outer shell 14 is suitably concentrically formed around the elevating means 10. Due to its being polluted, the filter medium may contain cohesive aggregats. These are broken down when they meet obstacles 15 in the washing path. The obstacles 15 are formed such that they force the filter medium to change direction somewhat, at the same time as its fall rate changes.

All the time it is in the washing path the filter medium meets a washing medium moving in a counter direction. The filtered liquid phase in the zone 8 above the filter bed is used as washing liquid. This zone 8 is in communication with the lower part of the washing path via a space 16 between the washing apparatus and an outer casing 17 forming a shield against the bed. The washing liquid is thus taken in at the lower part of the washing path, as illustrated by the arrow E in the embodiment example.

The washing liquid, or reject, polluted by washing, is taken from the washing path, as illustrated by the arrow F and is taken out via an overflow 18 and discharged from the apparatus, e.g. as illustrated by the arrow G. This overflow 18 should be adjustable in height and possibly in its width as well, to enable regulation of the washing liquid amount through the washing path. If the overflow is lowered, the washing liquid amount increases. This amount can also be affected by the clear solution level in the zone 8 being regulated by the overflow 9. It is the difference in level between the clear solution level in the zone 8 and the washing water level in the zone 8a above the washing apparatus that determines the washing liquid amount.

The filter medium, that has been washed during its passage along the washing path, is taken down to a lowest point with the aid of an oblique bottom 19 under the washing apparatus. Immediately above this lowest point there is the opening of a further conveying means 20 for the filter medium. In the embodiment example illustrated here, this also comprises a mammoth pump, e.g. with air as the conveying medium. The pipe of the conveying means 20 extends up to a level at a height above the upper side of the filter bed such that, with the aid of a distribution plate 21 provided with a roof it is possible to distribute the filter medium over the upper side of the filter bed.

Within the framework of given premises, i.e. the method and apparatus for carrying out filter medium washing, there has been achieved with the aid of the present invention a variant of the filtering unit, which has a considerably reduced construction height. In the described, and perhaps the most advantageous embodiment, the washing apparatus is still within the same configuration of the filtering unit since it has been sunk into the space for the filter medium itself. The filtering unit is consequently given the least possible space, not only in height but also laterally. The possibility still remains of compactly placing a plurality of filtering units side by side.

We claim:

1. Method for filtering a suspension or emulsion, said method comprising:

supplying the suspension or emulsion to a zone of particulate filter medium forming a filter bed, flowing said suspension or emulsion upwards through the filter bed during filtration and departing from the filter bed as a filtered liquid phase, flowing the particulate filter medium during filtration in a direction downwards through the zone in a counter flow to the suspension or emulsion past a point of entry of the suspension or emulsion for subsequent conveyance separate from the filter bed to a substantially vertical washing path disposed within said filter bed for washing the filter medium polluted by filtration, washing of the filter medium taking place during counter flow with respect to a washing liquid along the washing path after which the washed filter medium is returned to an upper side of the zone, taking polluted filter medium from a low point in the filter bed via the substantially vertical washing path and leaving said washing path at a level below that of a filter bed surface, at which level the washing liquid is supplied to said washing path, the washing liquid thus flowing in at an inlet end of the washing path and departing in a polluted state at a level above the inlet end to the path, and conveying the cleaned filter material from a point below the outlet of said washing path up to a level above said filter bed surface, where a zone of filtered liquid phase is maintained.

2. Method as claimed in claim 1, wherein the filter medium is subjected to changes in flow rate during passage along the washing path.

3. Method as claimed in claim 1, wherein a part of the filtered liquid phase above the filter bed is used as washing liquid.

4. Method as claimed in claim 1, wherein the polluted washing liquid is taken from the washing path at a level below the level of the filtered liquid phase.

5. Filtering apparatus for filtering a suspension or emulsion, said filtering apparatus comprising:

a filter tank, a zone of particulate filter medium forming a filter bed extending vertically in said filter tank;

an inlet to said filter tank for the suspension or emulsion which is to be filtered, said inlet being situated in a lower part of the filter bed zone, the suspension flowing in a direction upwards through the filter bed during filtration;

a space in said filter tank situated under the inlet and in free communication with the filter bed zone, the filter medium continuously being supplied to said space by the medium flowing in a direction downwards through the filter bed zone;

conveying means opening out into the space for elevating filtration-polluted filter medium which has been supplied to said space and for conveying the filtration-polluted filter medium to a washing apparatus in said filter tank separate from the filter bed;

said washing apparatus being passed through by the filter medium and a washing liquid for washing the filter medium in counter-flow, the washed filter medium being taken from the washing apparatus and returned to an upper side of the filter bed zone; and an outlet for washing liquid polluted by said washing located at an upper part of the washing apparatus, the washing apparatus including a vertical cylinder, a lower end of said washing apparatus being situated at a level lower than an upper surface of the filter bed, and at a given distance above an intake of the conveying means for the polluted filter medium, a reception space being located under said vertical cylinder for washed filter medium, a second conveying means having an intake and an outlet, the intake of the second conveying means being located in said space, the outlet of said second conveying means being located above the upper surface of the filter bed, an inlet to said vertical cylinder for the washing liquid being located at a lower end of said vertical cylinder, and an outlet of the washing liquid from the washing apparatus being located above an upper end of said vertical cylinder.

6. Filtering apparatus as claimed in claim 5, wherein the outlet of the washing liquid is lower than a level of the filtered liquid phase located above the filter bed.

7. Filtering apparatus as claimed in claim 6, wherein a height difference between said outlet and said level is regulatable.

8. Filtering apparatus as claimed in claim 6, wherein the washing apparatus is situated inside the filter bed and is surrounded by a chamber with an opening extending upwards towards the level of the filtered liquid phase, the lower end of said vertical cylinder being in communication with a bottom portion of said chamber, said bottom portion defining said space where said second conveying means has said intake.

9. Filtering apparatus as claimed in claim 8, wherein above the vertical cylinder is a collection chamber for the polluted washing liquid.

* * * * *